United States Patent
Zhou et al.

(10) Patent No.: US 12,556,060 B2
(45) Date of Patent: Feb. 17, 2026

(54) MOTOR BEARING LUBRICATION

(71) Applicant: GM GLOBAL TECHNOLOGY OPERATIONS LLC, Detroit, MI (US)

(72) Inventors: Sen Jiang Zhou, Troy, MI (US); Jeffrey R. Kelly, Whittaker, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 227 days.

(21) Appl. No.: 18/446,205

(22) Filed: Aug. 8, 2023

(65) Prior Publication Data

US 2025/0055346 A1 Feb. 13, 2025

(51) Int. Cl.
*H02K 5/173* (2006.01)
*F16C 33/66* (2006.01)
*H02K 7/08* (2006.01)

(52) U.S. Cl.
CPC ....... *H02K 5/1732* (2013.01); *F16C 33/6659* (2013.01); *H02K 7/083* (2013.01); *F16C 2380/26* (2013.01)

(58) Field of Classification Search
CPC .. H02K 5/1732; H02K 7/083; F16C 33/6659; F16C 2380/26
See application file for complete search history.

(56) References Cited

U.S. PATENT DOCUMENTS

2005/0077109 A1 4/2005 Ito et al.
2019/0001826 A1* 1/2019 Suzuki .................... B60L 50/16

FOREIGN PATENT DOCUMENTS

| AT | 110170 B | 7/1928 | |
| EP | 0671567 A1 * | 9/1995 | .......... F16C 33/6677 |
| EP | 1101961 A1 | 5/2001 | |

OTHER PUBLICATIONS

German Office Action from counterpart DE1020231329243 dated Feb. 26, 2025.

* cited by examiner

*Primary Examiner* — Terrance L Kenerly

(57) ABSTRACT

A motor includes a housing with a stator mounted to the housing. A drive shaft is rotatably mounted within the housing by a pair of bearing assemblies, the pair of bearing assemblies each including an inner bearing race and an outer bearing race. A rotor is mounted to the drive shaft. The drive shaft includes a longitudinal oil supply passage therein, the drive shaft including a first radial passage communicating with the longitudinal oil supply and extending to the inner race of a first one of the pair of bearing assemblies and a second radial passage communicating with the longitudinal oil supply and extending to the inner race of a second one of the pair of bearing assemblies. The inner race of the pair of bearing assemblies each include at least one lube hole.

9 Claims, 3 Drawing Sheets

MOTOR BEARING LUBRICATION

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to electric motors and more particularly to improved motor bearing lubrication.

Motor bearing lubrication is an important part in an electric drive unit design. On the one side, the bearing must be ensured to have enough lubrication to operate at the right temperatures and to generate the oil films at the contact areas. On the other hand, excessive oil will increase the churning loss and affect the motor's efficiency. Traditionally, the oil is supplied through the housing structures from the side of the motor bearings. The side supplies for the motor housing will lead to an oil bath at the lower bottom of the bearing and the oil will be spread through the motion of the bearing balls or rollers. This may result in excessive oil at the bottom and much less oil at the loaded areas. Accordingly, the present disclosure provides a more effective way of motor bearing lubrication. The oil will be provided at the center of the shaft and delivered to the bearing contact surface directly through the centrifugal force with the holes at the bearing inner raceway.

SUMMARY

Further areas of applicability of the present disclosure will become apparent from the detailed description, the claims and the drawings. The detailed description and specific examples are intended for purposes of illustration only and are not intended to limit the scope of the disclosure.

According to an aspect of the present disclosure, a motor includes a housing with a stator mounted to the housing. A drive shaft is rotatably mounted within the housing by a pair of bearing assemblies, the pair of bearing assemblies each including an inner bearing race and an outer bearing race. A rotor is mounted to the drive shaft. The drive shaft includes a longitudinal oil supply passage therein, the drive shaft including a first radial passage communicating with the longitudinal oil supply and extending to the inner race of a first one of the pair of bearing assemblies and a second radial passage communicating with the longitudinal oil supply and extending to the inner race of a second one of the pair of bearing assemblies. The inner race of the pair of bearing assemblies each include at least one lube hole.

According to a further aspect, the pair of bearing assemblies include four contact points.

According to a further aspect, the at least one lube hole is disposed between a pair of contact points of the inner race.

According to a further aspect, the pair of bearing assemblies include angular contact points.

According to a further aspect, the at least one lube hole is spaced from a contact point of the inner race.

According to a further aspect, the at least one lube hole includes a plurality of lube holes.

According to a further aspect, the pair of bearing assemblies include a plurality of ball bearings.

According to a further aspect, the pair of bearing assemblies include a plurality of roller bearings.

According to a further aspect, the at least one lube hole supplies oil to an opening at an end of the plurality of roller bearings.

According to a further aspect, the outer bearing race of at least one of the pair of bearing assemblies include an oil catcher that extends radially inward from an end thereof.

According to a further aspect, the oil catcher is formed integral with the outer bearing race.

According to a further aspect, the oil catcher is connected to the outer bearing race.

According to a further aspect, the drive shaft includes a recessed annular groove in an outer surface that is aligned with the at least one lube hole in the inner race of the pair of bearing assemblies.

According to another aspect of the principles of the present disclosure, a motor, comprising a housing with a stator mounted to the housing. a drive shaft is rotatably mounted within the housing by a pair of bearing assemblies and a rotor is mounted to the drive shaft. The drive shaft includes a longitudinal oil supply passage therein with the drive shaft further including a first radial passage communicating with the longitudinal oil supply and extending to a first one of the pair of bearing assemblies and a second radial passage communicating with the longitudinal oil supply and extending to a second one of the pair of bearing assemblies.

According to a further aspect, the pair of bearing assemblies include a plurality of roller bearings.

According to a further aspect, the first radial passage and the second radial passage supply oil to an opening at an end of the plurality of roller bearings.

According to a further aspect, an outer bearing race of at least one of the pair of bearing assemblies include an oil catcher that extends radially inward from an end thereof.

According to a further aspect, the oil catcher is formed integral with the outer bearing race.

According to a further aspect, the oil catcher is connected to the outer bearing race. the at least one lube hole includes a plurality of lube holes.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
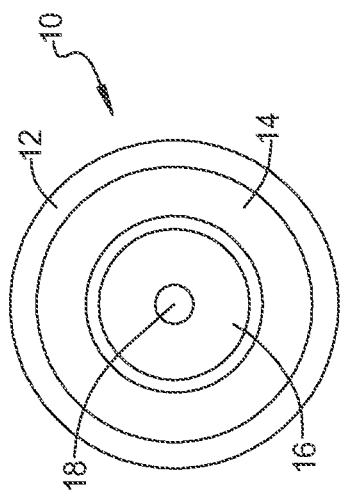
FIG. 1 is a schematic view of a motor according to the principles of the present disclosure.
Figure 2:
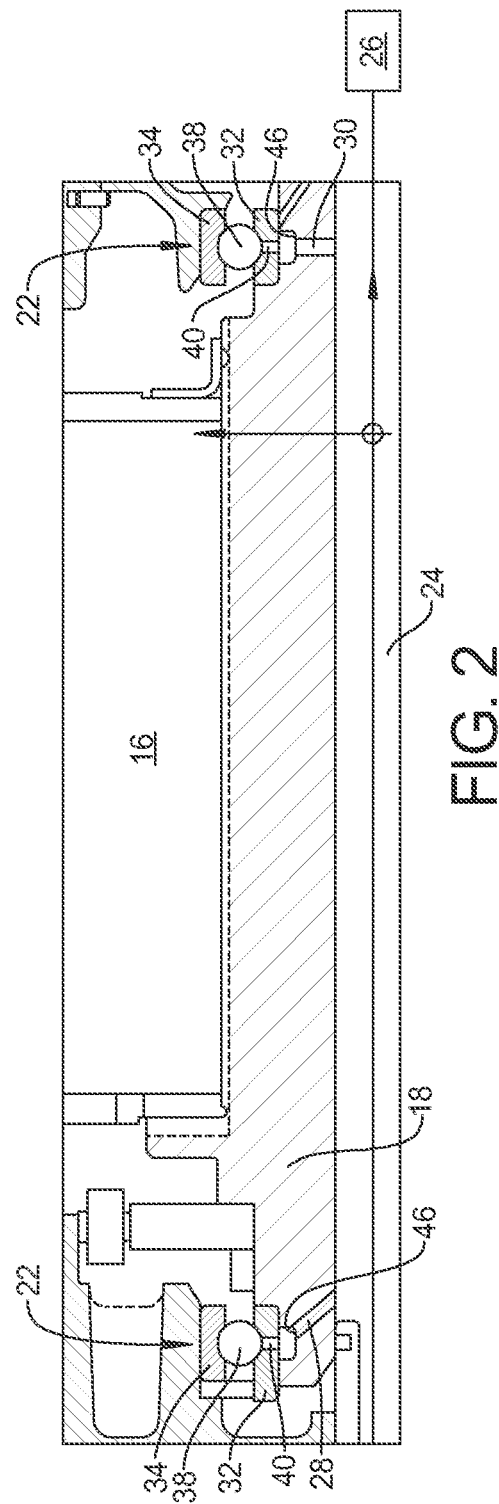
FIG. 2 is a partial cross-sectional view of the drive shaft and bearing assemblies according to the principles of the present disclosure.

With reference to FIG. 1, an electric motor 10 is shown including a housing 12 with a stator fixed 14 to the housing 12. A rotor 16 is rotatably supported within the housing 12 by a drive shaft 18. With reference to FIG. 2, the drive shaft 18 is supported at opposite ends by a pair of bearing assemblies 20, 22. The drive shaft 18 includes a longitudinal oil supply passage 24 therein that is connected to an oil supply 26. The drive shaft 18 further includes a first radial passage 28 communicating with the longitudinal oil supply passage 24 and extending to a first one of the pair of bearing assemblies 20 and a second radial passage 30 communicating with the longitudinal oil supply passage 24 and extending to a second one of the pair of bearing assemblies 22.

Figure 3:
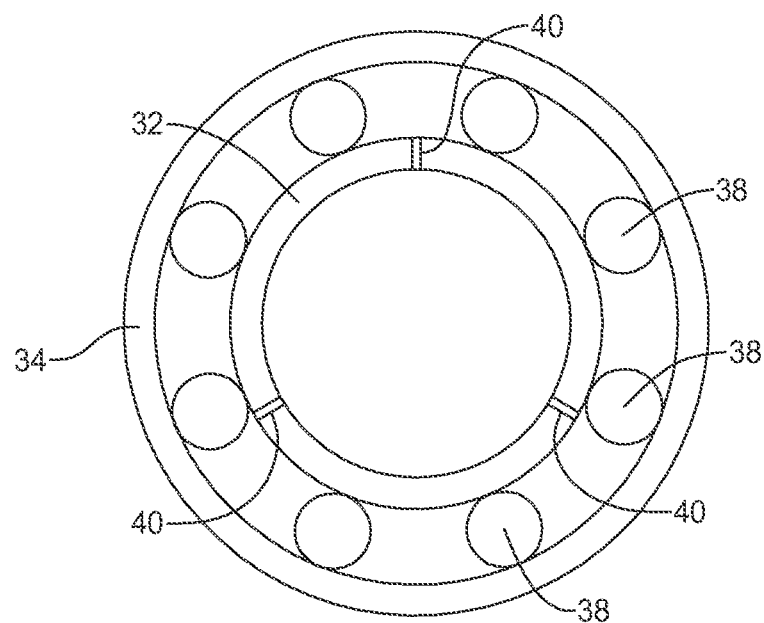
FIG. 3 is a schematic view of the bearing assembly.
Figure 4:
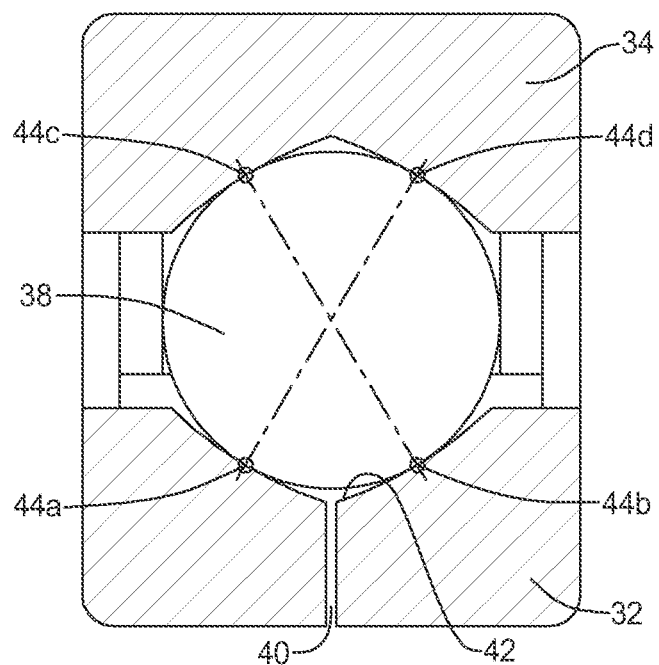
FIG. 4 is a cross-sectional view of a four point contact ball bearing according to the principles of the present disclosure.

With reference to FIGS. 2-4, the pair of bearing assemblies 20, 22 include an inner race 32, an outer race 34, a plurality of balls 38 supported between the inner race 32 and the outer race 34 by a cage 38. The inner race 32 of the pair of bearing assemblies 20, 22 each include one or more lube holes 40 that communicate with the first radial passage 28 and the second radial passage 30. When a plurality of lube holes 40 are used, they can be circumferentially spaced around the inner race and preferably located in a non-loaded area 42 of the inner race. In particular, as shown in FIG. 4, the bearing assemblies 20, 22 can be a four contact bearing wherein the balls 38 contact the inner race 32 and the outer race 34 at four contact points 44a-44d so that two of the contact points with the inner race 32 are spaced from the lube holes 40. With reference to FIG. 2, an outer surface of the drive shaft can include a recessed annular groove 46 in communication with the first radial passage 28 and the second radial passage 30 and with the lube holes 40 in the inner race 32 of the pair of bearing assemblies 20, 22.

Figure 5:
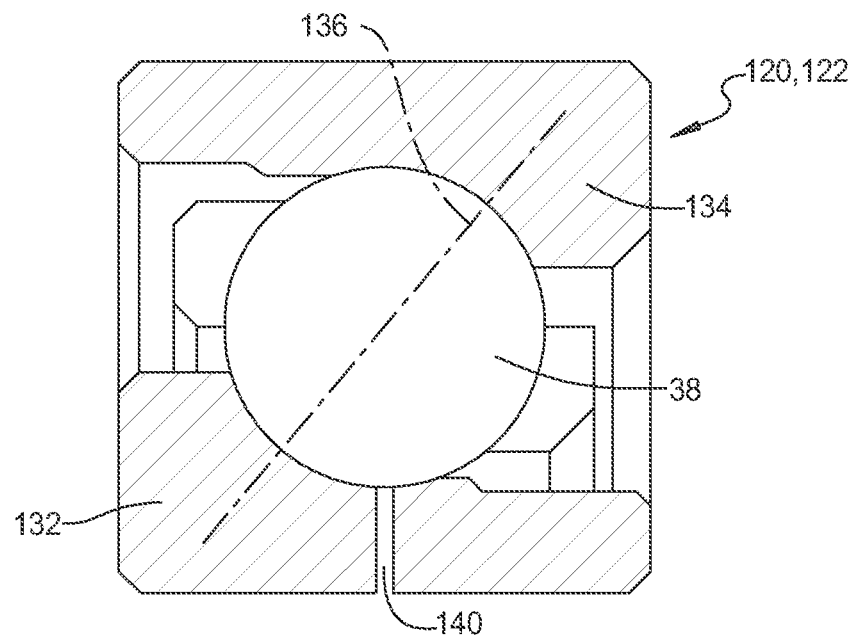
FIG. 5 is a cross-sectional view of an angular contact ball bearing according to the principles of the present disclosure.

Alternatively, as shown in FIG. 5, the bearing assemblies can be an angular contact bearing wherein the balls 38 of the bearing assemblies 120, 122 contact the inner race 132 and the outer race 134 along an angular contact line 136. Accordingly, the lube holes 140 of the bearing assemblies 120, 122 are not aligned with the loaded areas of the angular contact bearings 120, 122.

Figure 6:
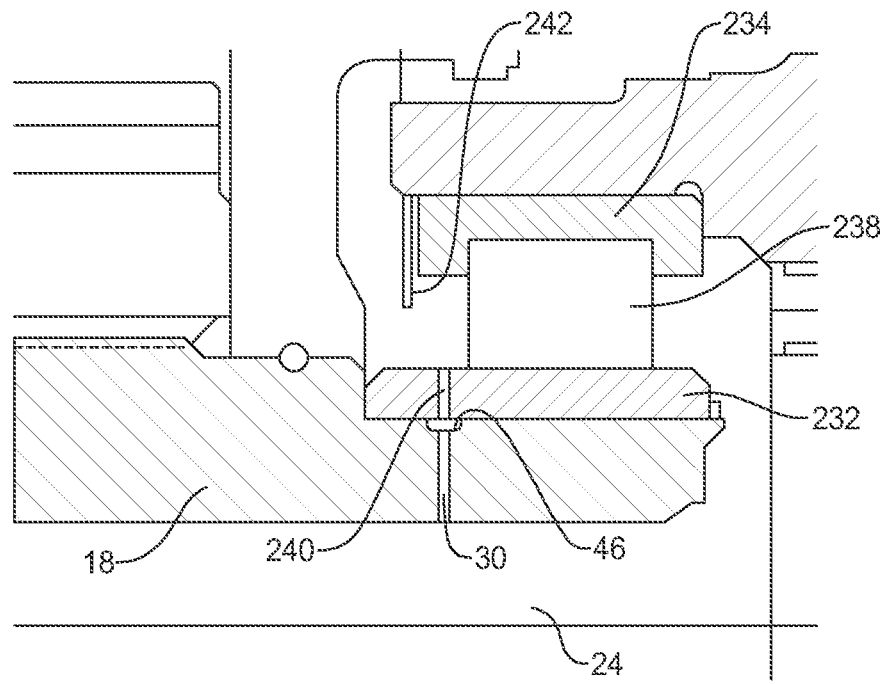
FIG. 6 is a partial cross-sectional view of a roller bearing assembly according to the principles of the present disclosure.

According to yet another alternative, as shown in FIG. 6, the bearing assemblies 220, 222 can include roller bearings 238. The inner race 232 of the bearing assemblies 220, 222 include lube holes 240 that are spaced laterally of the roller bearings 238. In addition, the bearing assemblies 220, 222 can include an outer race 234 with an oil catcher structure 242 that can block and direct oil back toward the roller bearings 238. The oil catcher structure 242 can be formed integral with the outer race 234 or formed separate and connected to the outer race 234. It should be understood that the inner race can be formed separate or formed integrally with the drive shaft 18.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

What is claimed is:

1. A motor, comprising:
   a housing;
   a stator mounted to the housing;
   a drive shaft rotatably mounted within the housing by a pair of bearing assemblies, the pair of bearing assemblies each including an inner bearing race and an outer bearing race and a plurality of roller bearings;
   a rotor mounted to the drive shaft; and
   wherein the drive shaft includes a longitudinal oil supply passage therein, the drive shaft including a first radial passage communicating with the longitudinal oil supply and extending to the inner race of a first one of the pair of bearing assemblies and a second radial passage communicating with the longitudinal oil supply and extending to the inner race of a second one of the pair of bearing assemblies, the inner race of the pair of bearing assemblies each including at least one lube hole that supplies oil to an opening at an end of the plurality of roller bearings, wherein the outer bearing race of at least one of the pair of bearing assemblies include an oil catcher that extends radially inward from an end thereof and configured to block and direct oil back toward the plurality of roller bearings.

2. The motor according to claim 1, wherein the at least one lube hole includes a plurality of lube holes.

3. The motor according to claim 1, wherein the oil catcher is formed integral with the outer bearing race.

4. The motor according to claim 1, wherein the oil catcher is connected to the outer bearing race.

5. The motor according to claim 1, wherein the drive shaft includes a recessed annular groove in an outer surface that is aligned with the at least one lube hole in the inner race of the pair of bearing assemblies.

6. A motor, comprising:
   a housing;
   a stator mounted to the housing;
   a drive shaft rotatably mounted within the housing by a pair of bearing assemblies each including a plurality of roller bearings;
   a rotor mounted to the drive shaft; and
   wherein the drive shaft includes a longitudinal oil supply passage therein, the drive shaft including a first radial passage communicating with the longitudinal oil supply and extending to a first one of the pair of bearing assemblies and a second radial passage communicating with the longitudinal oil supply and extending to a second one of the pair of bearing assemblies, wherein the first radial passage and the second radial passage supply oil to an opening at an end of the plurality of roller bearings, wherein an outer bearing race of at least one of the pair of bearing assemblies include an oil catcher that extends radially inward from an end thereof and configured to block and direct oil back toward the plurality of roller bearings.

7. The motor according to claim 6, wherein the oil catcher is formed integral with the outer bearing race.

8. The motor according to claim 6, wherein the oil catcher is connected to the outer bearing race.

9. The motor according to claim 6, wherein the at least one lube hole includes a plurality of lube holes.

* * * * *